Sept. 19, 1950     J. H. HELLING     2,522,614
ELECTRIC ELEVATOR

Filed April 15, 1946     2 Sheets-Sheet 1

Sept. 19, 1950　　　　　　J. H. HELLING　　　　　2,522,614
ELECTRIC ELEVATOR

Filed April 15, 1946　　　　　　　　　　　　2 Sheets-Sheet 2

Inventor
Johannes H. Helling
by
Atty.

Patented Sept. 19, 1950

2,522,614

UNITED STATES PATENT OFFICE 2,522,614

ELECTRIC ELEVATOR

Johannes H. Helling, Rotterdam, Netherlands

Application April 15, 1946, Serial No. 662,129
In the Netherlands April 13, 1944

Section 1, Public Law 690, August 8, 1946
Patent expires April 13, 1964

4 Claims. (Cl. 187—23)

This invention relates to elevator systems and more particularly to a system wherein the hoisting-pulley shaft is counterbalanced.

In electric elevator systems, a reduction system is usually provided between the driven pulley and the motor for driving the pulley at reduced speed. Even very slow running motors cannot be directly coupled to the driven pulley as the hoisting speed is still too high. Furthermore, slow running motors are undesirable as they are large and expensive.

One form of reduction system between the hoisting motor and the driven pulley comprises two pulleys which are coaxially mounted and driven at different speeds, usually these pulleys are fixed on a driven shaft and have different diameters so that they have different peripheral speeds. By this arrangement, the cable passes from one driven pulley around an idler suspension pulley, carrying the load to be lifted, to the other driven pulley. As a consequence of the difference in the peripheral speeds of the driven pulleys, the total length of the cable extending to the idler suspension pulley is varied and the load is thereby lifted or lowered. According to this reduction system, the hoisting speed is equal to half the difference of the peripheral speeds of the two driven pulleys. It is thus possible to obtain desired hoisting speeds independently of the motor speed.

Electric elevator systems of this type are known wherein each side of the cable running down from a driven pulley is taken up in a tackle. With this arrangement, one of the tackles carries the counter-weight and the other tackle an auxiliary weight acting on the driven pulley shaft in the same direction of the car and consequently increasing the dead-weight on said shaft and, further, complicating the installation.

Having in mind the defects of the prior art apparatus, it is an object of the present invention to provide apparatus wherein the driven pulley shaft is counter-balanced. It is another object of the invention to provide an apparatus having ease of installation, simplicity of organization, economy of construction and efficiency of operation.

According to the present invention, the endless cable passes from around one side of one driven pulley over an idler guide pulley to a loose suspension pulley, from which the load to be lifted is suspended, and then to and around the other side of the other driven pulley to a loose suspension pulley, from which the counter-weight is suspended, and up over a second idler guide pulley and back to said first driven pulley. With this arrangement, the cable extending to the car, also extends to the counter-weight so that the difference in the circumferential speeds of the two driven pulleys is also used in connection with the counter-weight. Furthermore, the cable extends around opposite sides of the driven pulleys so that their shaft is counter-balanced.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts throughout and in which—

Figure 1:
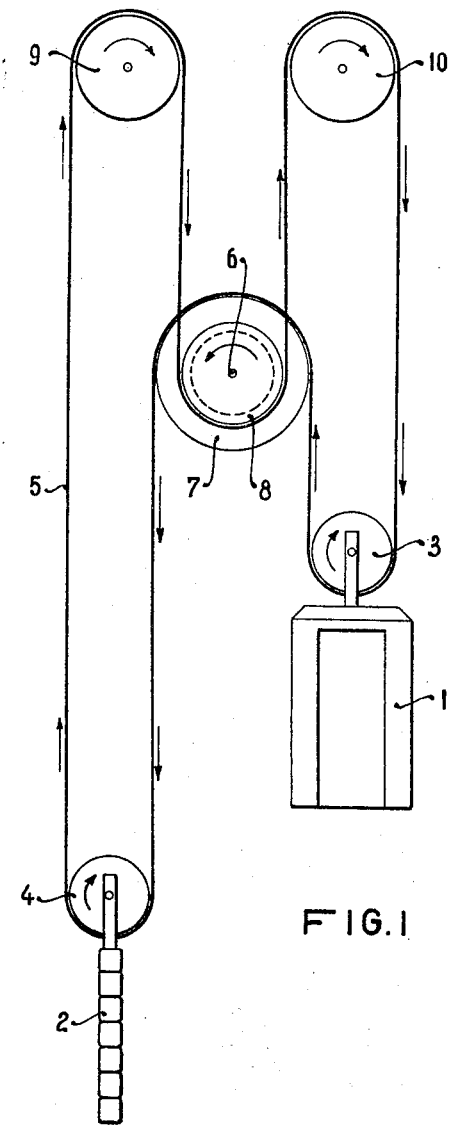
Fig. 1 is a diagrammatic view of the suspension system of the elevator car and counter-weight in accordance with the present invention.
Figure 2:
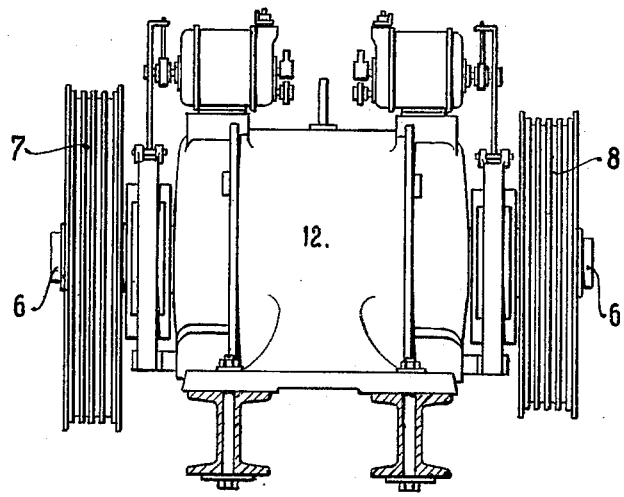
Fig. 2 is a side view in elevation of an elevator motor having driven pulleys at both ends of its shaft.
Figure 3:
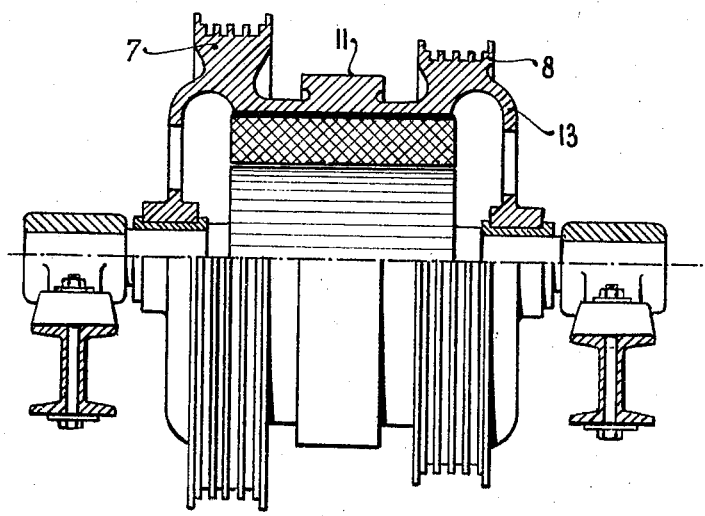
Fig. 3 is a side view in elevation and partially in longitudinal cross-section of a modified motor in which the driven pulleys are formed integrally as part of the rotary casing surrounding stationary field windings.

Referring to the drawings, specifically to Fig. 1, an elevator car 1 and a counter-weight 2 are each suspended from individual loose suspension pulleys 3 and 4, respectively, by an endless cable 5. A driven shaft 6 which may be the motor shaft, is positioned adjacent the path of the elevator car and supports a pair of driven pulleys 7 and 8, these latter pulleys 7 and 8 having different diameters. Preferably, the driven pulleys 7 and 8 are rotated in the same direction and at the same speed so that they have different peripheral speeds. A pair of idler guide pulleys 9 and 10 are mounted above the elevator shaft. The cable 5 passes between each of said pulleys by extending over the larger driven pulley 7, down around the suspension pulleys 3 and 4 respectively, up and over the guide pulleys 9 and 10 respectively, and down around the smaller driven pulley 8. One suitable arrangement of the drive system is shown in Fig. 2, wherein the driven pulleys 7 and 8 are secured on the ends of the shaft 6 of a hoisting motor 12. In a modified embodiment, as shown in Fig. 3, the pulleys 7 and 8 form part of the rotary casing 13 of the stationary field windings of a motor 12'. According to this modification, a brake drum 11 may be arranged around the rotary casing 13 and between the pulleys 7 and 8. Although only one cable is shown in Fig. 1, it will be clear that in practice two or more cables may be used and the pulleys accordingly provided with a plurality of grooves as shown in Figs. 2 and 3.

In accordance with the present invention, it will be noted that the deadweight load on the shaft 6 is counterbalanced by the pull of the cable 5 in opposite directions on the pulleys 7 and 8. Obviously, the driven pulleys 7 and 8 need not be fixed to the shaft 6 but may be coaxially mounted on said shaft 6 and individually driven, the deadweight load on the shaft 6 nevertheless, being counter-balanced.

Although certain specific embodiments of the invention have been shown and described, it is obvious that many modifications thereof are possible. The invention, therefore, is not to be restricted except insofar as is necessitated by the prior art and by the spirit of the appended claims.

What I claim is:

1. In combination, a suspension pulley, a load supporting member suspended from said suspension pulley and movable through a vertical path, a second suspension pulley, a weight for counterbalancing said member, said weight being suspended from said second suspension pulley and movable through a vertical path adjacent the path of said member, a pair of pulleys above said paths and driven at different peripheral speeds, an idler pulley mounted above each of said paths, and an endless cable extending around beneath one of said driven pulleys, up and over said idler pulleys, down beneath said suspension pulleys and up and over the other of said driven pulleys.

2. In combination, a suspension pulley, a load supporting member suspended from said suspension pulley and movable through a vertical path, a second suspension pulley, a weight to counterbalance said member, said weight being suspended from said second suspension pulley and movable through a vertical path adjacent the path of said member, a shaft horizontally mounted above said paths, a pair of pulleys mounted on said shaft and driven at different peripheral speeds, an idler pulley mounted above each of said paths, and an endless cable extending around beneath one of said driven pulleys, up and over said idler pulleys, down beneath said suspension pulleys and up and over the other of said driven pulleys.

3. In combination, a suspension pulley, an elevator car suspended from said suspension pulley and movable through a vertical path, a second suspension pulley, a weight to counterbalance said car, said weight being suspended from said second suspension pulley and movable through a path adjacent the path of said car, an axle horizontally mounted above said paths, a motor for driving said axle, a pair of pulleys on said axle and driven therewith, said pair of pulleys having different diameters so that they are driven at different peripheral speeds, an idler pulley mounted above each of said paths and with their upper peripheries above the lower periphery of the smaller of said driven pulleys, and an endless cable extending around beneath the smaller of said driven pulleys, up over said idler pulleys, down beneath said suspension pulleys and up and over the larger of said driven pulleys.

4. The combination defined in claim 1 wherein said pair of pulleys are formed integrally as a drum.

JOHANNES H. HELLING.

REFERENCES CITED

The following references are of record in the file of this patent:

UNITED STATES PATENTS

| Number | Name | Date |
|--------|------|------|
| 283,831 | Thayer | Aug. 28, 1883 |
| 535,946 | Fraser | Mar. 19, 1895 |